US011283782B2

(12) United States Patent
Agrawal et al.

(10) Patent No.: US 11,283,782 B2
(45) Date of Patent: Mar. 22, 2022

(54) ISO LAYER-TWO CONNECTIVITY USING ISO LAYER-THREE TUNNELING

(71) Applicant: Hewlett Packard Enterprise Development LP, Houston, TX (US)

(72) Inventors: Amit Agrawal, Bangalore (IN); Nagendra Babu Rapaka, Bangalore (IN); Ravi Suhane, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 163 days.

(21) Appl. No.: 16/696,813

(22) Filed: Nov. 26, 2019

(65) Prior Publication Data
US 2021/0160229 A1 May 27, 2021

(51) Int. Cl.
*H04L 29/06* (2006.01)
(52) U.S. Cl.
CPC ...... *H04L 63/0485* (2013.01); *H04L 63/0272* (2013.01); *H04L 63/0853* (2013.01)
(58) Field of Classification Search
CPC ............ H04L 63/0272; H04L 63/0485; H04L 63/0853
See application file for complete search history.

(56) References Cited

U.S. PATENT DOCUMENTS

| 7,751,391 | B2 | 7/2010 | Boden et al. |
| 7,916,682 | B2 | 3/2011 | Nagarajan et al. |
| 9,800,552 | B2 | 10/2017 | Garg et al. |
| 2004/0088542 | A1* | 5/2004 | Daude ................. H04L 63/0272 713/156 |
| 2010/0124228 | A1* | 5/2010 | Tinnakornsrisuphap .................... H04L 12/66 370/392 |
| 2014/0136660 | A1* | 5/2014 | Ghai ................... H04L 12/2836 709/219 |

(Continued)

OTHER PUBLICATIONS

Cambium Networks Community, "Layer-2 Generic Routing Encapsulation (L2GRE/softGRE) support on cnPilot E-series Devices", available online at <https://community.cambiumnetworks.com/t5/cnPilot-E-Series-Enterprise-APs/Layer-2-Generic-Routing-Encapsulation-L2GRE-softGRE-support-on/td-p/63514>, retrieved on Oct. 15, 2019, 9 pages.

(Continued)

*Primary Examiner* — Olugbenga O Idowu
(74) *Attorney, Agent, or Firm* — Sheppard Mullin Richters Hampton LLP

(57) ABSTRACT

Systems and methods related to a VPN controller are provided. In some embodiments, a first VPN controller is configured to establish a VPN tunnel with a client endpoint, wherein the VPN tunnel is established using an authentication process of the client endpoint, route a L2 request to a second VPN controller via an established communication tunnel between the first VPN controller and the second VPN controller by identifying a Generic Routing Encapsulation (GRE) header of the L2 request and based on the GRE header of the L2 request, directing the L2 request to a responsive L2 device accessible by the second VPN controller, receive an encapsulated L2 response from the second VPN controller identifying acceptance of the L2 request, and enable an electronic communication between the client endpoint and the responsive L2 device at least via the VPN tunnel between the client endpoint and the first VPN controller.

20 Claims, 7 Drawing Sheets

(56) References Cited

U.S. PATENT DOCUMENTS

2018/0069924 A1    3/2018    Tumuluru et al.

OTHER PUBLICATIONS

SoftEther VPN, "Layer-2 Ethernet-based VPN: Full Ethernet Virtualization", available online at <https://www.softether.org/1-features/2._Layer-2_Ethernet-based_VPN>, retrieved on Oct. 15, 2019, 13 pages.

* cited by examiner

ISO LAYER-TWO CONNECTIVITY USING ISO LAYER-THREE TUNNELING

DESCRIPTION OF RELATED ART

The Open Systems Interconnection model (OSI model) is a data model or conceptual framework promulgated by the International Organization for Standardization (ISO). The OSI model characterizes and standardizes the communication functions of various telecommunications or computing, e.g., networking, systems without regard to telecommunications/computing system's underlying internal structure and technology. In short, the OSI model allows different systems to be able to communicate with each other using a standard protocol/scheme.

The model partitions a given system into seven abstracted layers representing different aspects of communication or the exchanging of data (layers 1-7), each stacked upon the last. The first layer is the physical layer, which transmits and receives raw bit streams over a physical medium. The second layer ("L2") is a datalink layer, which provides node to node data transfer including a Medium Access Control (MAC) layer that is responsible for controlling how devices in a network gain permission to transmit data. The third layer ("L3") is a network layer, which provides a way for transferring variable length data sequences from one node to another connected in a different network, including via an Internet Protocol (IP) address. The fourth layer is a transport layer associated with segmentation, acknowledgment, and multiplexing. The fifth through seventh layers, include the session layer, presentation layer, and application layer, respectively.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
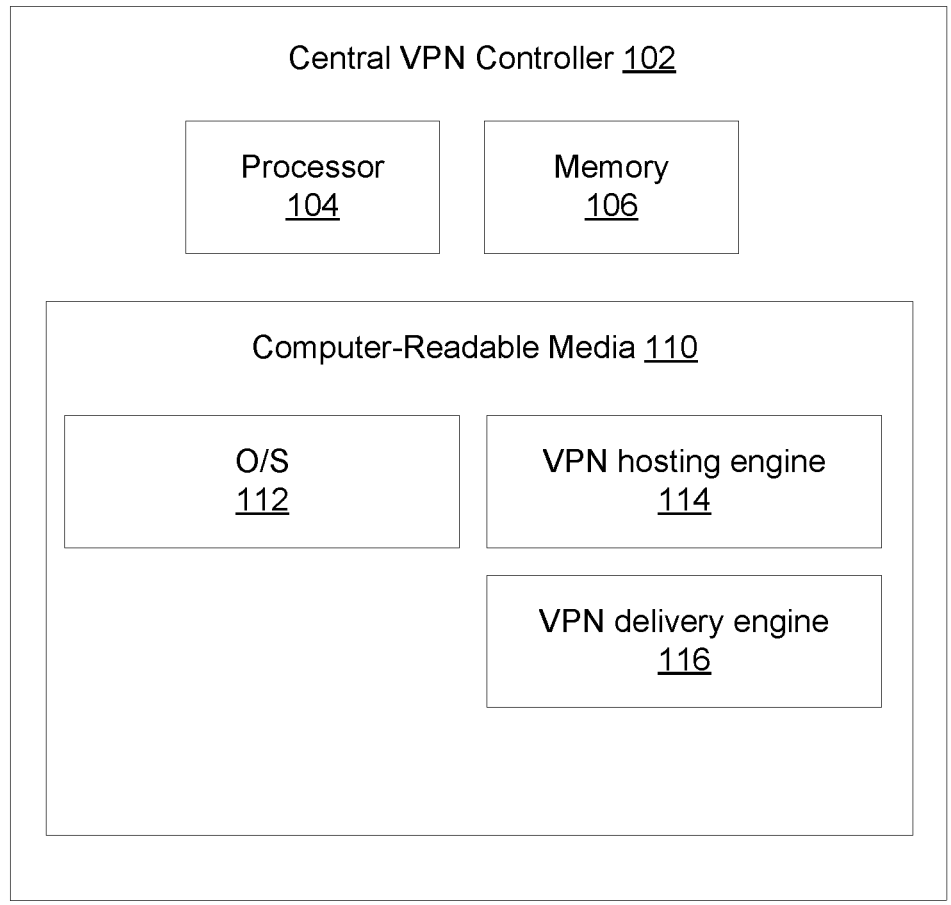
FIG. 1 illustrates an example of a central VPN controller, according to an embodiment of the disclosure.

The figures are not exhaustive and do not limit the present disclosure to the precise form disclosed.

DETAILED DESCRIPTION

In a standard computer network, client endpoints establish a Virtual Private Network ("VPN") connection over the internet to a VPN controller to join the local network of the VPN controller for the purposes of accessing resources in that network, through a standard layer-three ("L3") VPN tunnel. For example, in a standard L3 VPN tunnel, the VPN software on the client device generates a virtual adapter that is dynamically assigned an IP address on the local network (e.g., via a layer-two ("L2") request like a DHCP request) provided by the VPN controller or alternate DHCP provider in that local network. In order for devices on the VPN controller's local network to reach devices in a remote network, a site-to-site L3 VPN tunnel would be required to allow for traffic to be securely routed between the local and remote networks over the internet.

In another example, VPN software on the client device can generate a virtual adapter that generates an L2 data packet (e.g., a multicast request or IPv6 configuration request) and transmits the L2 data packet to one or more receivers (e.g., the VPN controller or alternate devices in the local network) on the standard L3 VPN tunnel during an IP multicast process. However, similar to the DHCP process, in order for devices on the VPN controller's local network to reach devices in a remote network, a site-to-site L3 VPN tunnel would be required to allow for traffic to be securely routed between the local and remote networks over the internet.

In embodiments of the present disclosure, which improve upon standard VPN connectivity between networks, an existing L3 VPN tunnel can be used to securely forward L2 data frames without the additional overhead traditionally associated with conventional L2 tunnel or session establishment. This may differ from standard L2 VPN or L3 VPN connections between networks. For example, a standard L2 VPN connection may virtualize the L2 data layer, so that geographically separate locations appear as if they are operating in the same local area network or physical connection, whereas a standard L3 VPN connection may virtualize the L3 data layer, so that it may be possible to provide access to and route data from a local network to an VPN connected endpoint over the Internet or service provider infrastructure (e.g. site-to-site tunnel using multiprotocol label switching (MPLS), etc.). The improved networking can still permit a client endpoint to access devices at the network local to the VPN controller over the existing L3 VPN tunnel (e.g., using the first virtual adapter). In addition, the client endpoint can reach devices local to the remote network through an L2 virtual tunnel between the client endpoint and the VPN controller local to the remote network, which is embedded within the existing L3 VPN tunnel.

To establish the L2 virtual tunnel, the VPN software on the client endpoint creates a second virtual adapter that initiates a second DHCP request. This second DHCP request traverses the existing L3 VPN tunnel to the first VPN controller. Upon receipt of the second DHCP request (e.g., L2 data), the first VPN controller determines where to forward the second DHCP request. The first VPN controller can use authentication or registration information of the client endpoint (e.g., virtual local area network (VLAN), role attributes, etc.) to determine where to forward the second DHCP request (e.g., to a controller that is local to a remote network). The second DHCP request (e.g., L2 data) is then encapsulated using the Generic Routing Encapsulation (GRE) protocol (e.g., L3 data using GRE-based encapsulation) at the first VPN controller and forwarded to the appropriate controller on the remote network for the client endpoint.

The controller that is local to the remote network from the client endpoint (e.g., a "second VPN controller" or a "home division controller") removes the GRE-based encapsulation of the data packet from the first VPN controller and passes the second DHCP request to a L2 responsive device corresponding to the request, which in this example is a DHCP server in the second controller's local network. The response to the second DHCP request is passed back through the second controller where it is GRE-based encapsulated and sent to the first VPN controller. The first VPN controller removes the GRE-based encapsulation and encrypts the response to the second DHCP request to allow the response to traverse the existing L3 VPN tunnel to the client endpoint. Once the client endpoint receives the DHCP response, the second virtual adapter that initiated the second DHCP request is configured with an IP address from the second controller's local network and a L2 virtual tunnel is established between the client endpoint and the second controller. The L2 virtual tunnel is embedded within the existing L3 VPN tunnel to the client endpoint.

Before describing embodiments of the disclosed systems and methods in detail, it is useful to describe an example VPN controller with which these systems and methods might be implemented in various applications. An illustrative VPN controller is provided with FIG. 1. VPN controller 102 may include one or more hardware processors 104, memory 106, and one or more machine-readable storage media 110. In some embodiments, VPN controller 102 may be an embodiment of a central VPN controller or home VPN controller.

Hardware processor 104 may be one or more central processing units (CPUs), semiconductor-based microprocessors, and/or other hardware devices suitable for retrieval and execution of instructions stored in machine-readable storage media 110. Hardware processor 104 may fetch, decode, and execute instructions to control processes or operations for establishing and communication via various communication tunnels. As an alternative or in addition to retrieving and executing instructions, hardware processor 104 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage media 110, may be any electronic, magnetic, optical, or other physical storage device that contains or stores executable instructions. Thus, machine-readable storage media 110 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage media 110 may be a non-transitory storage medium, where the term "non-transitory" does not encompass transitory propagating signals. As described in detail below, machine-readable storage media 110 may be encoded with executable instructions.

Machine-readable storage media 110 may comprise operating system 112 and one or more engines for executing instructions, including VPN hosting engine 114 and VPN delivery engine 116. Operating system 112 may control and schedule computer processes for execution, perform memory management, provide a file system, networking, I/O services, and user interface functionality, such as a graphical user interface ("GUI"), among other things.

VPN hosting engine 114 may be configured to establish a VPN tunnel between two devices, including a client endpoint and VPN controller 102 or between two VPN controllers. The establishment of the VPN tunnel may be provided periodically, on request from a device, by other methods, or any combination thereof.

VPN delivery engine 116 may be configured to enable an electronic communication between the established VPN tunnel. For example, the electronic communication may be conducted between a client endpoint and a responsive L2 device using the established VPN tunnel. In some examples, the electronic communication may be transmitted between the client endpoint and the first VPN controller, and/or the first VPN controller and the second VPN controller.

VPN delivery engine 116 may be configured to route a L2 request to other devices, including a second VPN controller. The routing of the L2 request may traverse an established communication tunnel between the devices (e.g., the first VPN controller and the second VPN controller, etc.). In some examples, the routing may be performed by identifying a Generic Routing Encapsulation (GRE) header of the L2 request. Based on the GRE header of the L2 request, VPN delivery engine 116 may be configured to direct the L2 request to a responsive L2 device accessible by a second VPN controller.

VPN delivery engine 116 may be configured to receive an encapsulated L2 response. The response may be received from the second VPN controller identifying acceptance of the L2 request.

Figure 2:
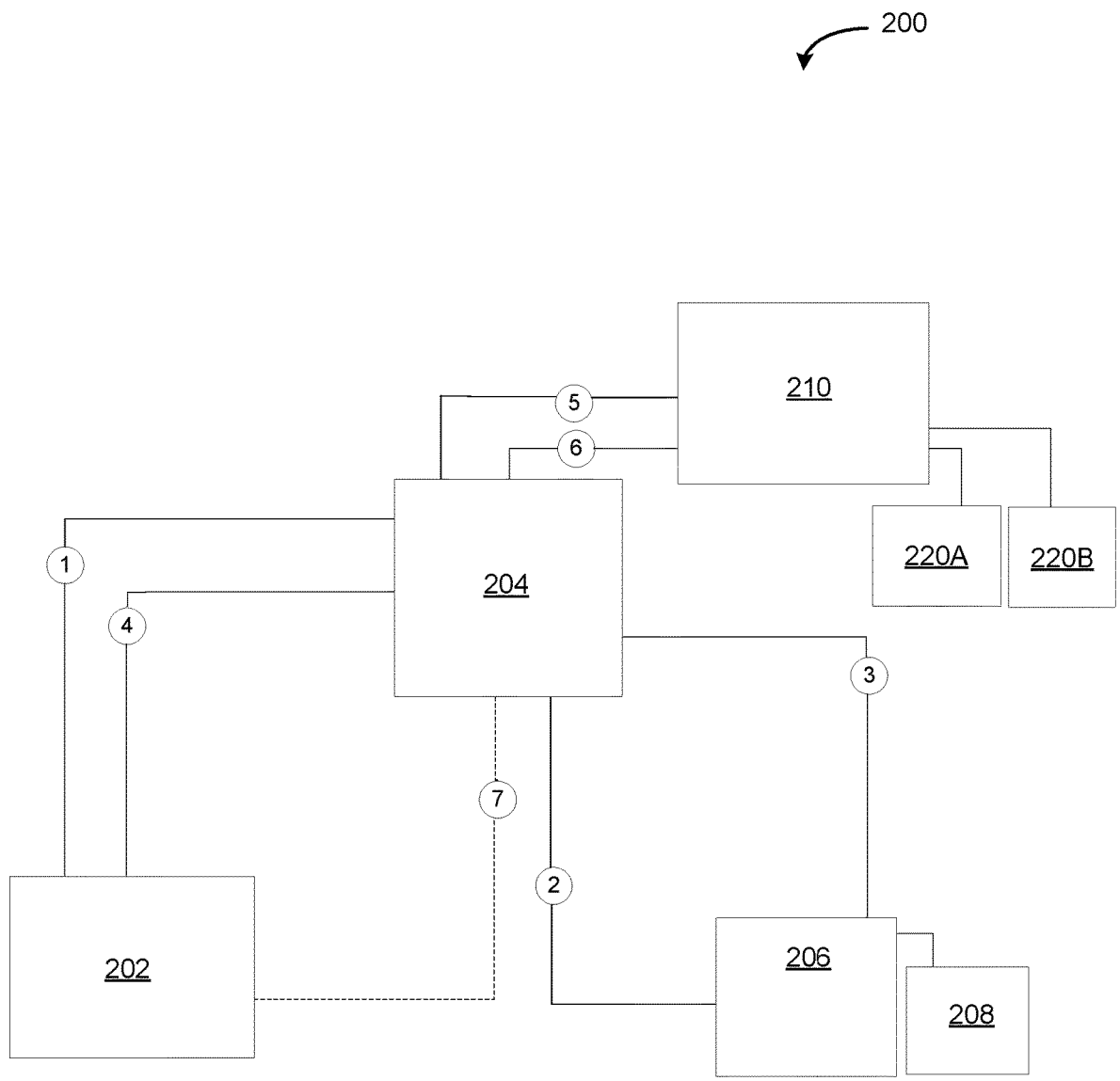
FIG. 2 illustrates an example of a network configuration implemented for a single client endpoint connected to a public network by accessing a central VPN controller using L3 tunneling, and further accessing resources in a home division network using L2 virtual tunneling, according to an embodiment of the disclosure.

FIG. 2 illustrates one example of a network configuration 200 that may be implemented for a single client endpoint connected to a public network by accessing a first VPN controller using L3 tunneling, and further accessing resources in a second network using L2 virtual tunneling.

Client endpoint 202 may be included within a public network, which can be, for example, a home network. Examples of client endpoint 202 may include: desktop computers, laptop computers, tablet computers, netbook computers, smart phones, and the like.

First VPN controller 204 may provide communication functionality for a network local to first VPN controller 204 for client endpoint 202. First VPN controller 204 may not be the only point of communication with the network. For example, a single controller is illustrated, though the local network may include multiple controllers and/or multiple communication points.

Network configuration 200 may include one or more remote networks that are located in a different physical or geographical location from client endpoint 202, including second controller 210 and one or more responsive L2 devices 220 (illustrated as DHCP server 220A and multicast server 220B). In some cases, the remote networks may be in the same geographical location as the network local to first VPN controller 204, but lack a direct connection to that local network.

The local or remote network to first VPN controller 204 may include third-party telecommunication lines, such as phone lines, broadcast coaxial cable, fiber optic cables, satellite communications, cellular communications, and the like. The networks may include any number of intermediate network devices, such as switches, routers, gateways, servers, and/or controllers, which are not directly part of the network configuration 200 but that facilitate communication between the various parts of the network configuration 200, and between the network configuration 200 and other network-connected entities.

Operations 1-4 may establish an L3 VPN tunnel. For example, once established, client endpoint 202 can access devices at a network local to first VPN controller 204 over the L3 VPN tunnel. VPN software may be installed on client endpoint 202 that generates a first virtual adapter that is dynamically assigned an IP address on the local network (e.g., via a DHCP request) provided by first VPN controller 204.

At operation 1 of FIG. 2, client endpoint 202 is configured to establish a VPN tunnel between client endpoint 202 and first VPN controller 204 through an authentication process of client endpoint 202. For example, client endpoint 202 may transfer one or more credentials (e.g., user password, PIN, one time password (OTP), etc.) to first VPN controller 204.

At operation 2, first VPN controller 204 may transfer the one or more credentials to authentication server 206. Authentication server 206 may compare the one or more credentials to a list of stored credentials associated with third party authentication device 208. Authentication server 206 may determine that the one or more credentials are contained within the list of stored credentials. For example, the one or more credentials from client endpoint 202 may correspond with a stored MAC address associated with client endpoint 202. When the one or more credentials or MAC address is listed as an authenticated device, authentication server 206 may confirm authentication of client endpoint 202.

In some examples, the authentication request may be declined. First VPN controller 204 may be configured to resend the one or more credentials to authentication server 206 for a pre-determined threshold number of attempts (e.g., two attempts). When the number of credential transmissions has exceeded the pre-determined threshold number of attempts, client endpoint 202 may be restricted from receiving an IP address on the network local to first VPN controller 204.

At operation 3, authentication server 206 may transmit a confirmation of authentication to first VPN controller 204. First VPN controller 204 may receive virtual LAN (VLAN) information and role attributes associated with client endpoint 202. In some examples, first VPN controller 204 may be configured to confirm authentication of the one or more credentials internally and without transmission to an external authentication server, or externally from a third party authentication device.

At operation 4, first VPN controller 204 may create a VPN tunnel (e.g., Internet protocol security ("IPsec") VPN tunnel, etc.) for data packet transmission between client endpoint 202 and first VPN controller 204. In establishing the L3 VPN tunnel, a secure network protocol tunnel may be established that encrypts the packets of data between client endpoint 202 and first VPN controller 204.

The VPN tunnel may be implemented using a secure communication protocol. For example, in some embodiments, the VPN request is a request to initiate an IPSec connection. In some embodiments, the VPN request is a request to initiate a Secure Sockets Layer (SSL) connection. However, other forms of VPN tunneling may be employed. First VPN controller 204 may create the secure communication tunnel for data packet transmission between client endpoint 202 and first VPN controller 204.

In some examples, operations 1-4 may alternatively correspond with a negotiation of a security association (SA) through an Internet Key exchange (IKE). This may be implemented over user datagram protocol (UDP) port 500 and may use either shared passwords, public keys, or X.509 certificates on both ends, although other keying methods may exist without diverting from the essence of the disclosure.

When operations 1-4 corresponding with the authentication process is complete, client endpoint 202 can access devices at a network local to first VPN controller 204 over the established L3 VPN tunnel using the first virtual adapter that was installed on client endpoint 202. VPN software may be installed on client endpoint 202 that generates a first virtual adapter that is dynamically assigned an IP address on the local network (e.g., via a DHCP request) provided by first VPN controller 204.

The VPN software on client endpoint 202 creates a second virtual adapter that initiates a second DHCP request. This second DHCP request traverses the established L3 VPN tunnel to first VPN controller 204. Upon receipt of the second DHCP request, first VPN controller 204 determines where to forward the second DHCP request. The first VPN controller can use authentication or registration information of client endpoint 202 (e.g., VLAN, role attributes, etc.) to determine where to forward the second DHCP request (e.g., the "second VPN controller" or the "home division controller"). In some examples, a network administrator may employ static rules associated with the authentication or registration information, including linking a specific username to a specific VLAN, or dynamic rules, including receiving authentication requirements from authentication server 206 or third party authentication device 208 (e.g., linking dynamic IP addresses, etc.).

At operations 5 and 6 of FIG. 2, L2 data packets may be transmitted between first VPN controller 204 and second controller 210 using a GRE tunnel that can encapsulate L2 data packets for transmission. For example, a process utilizing a DHCP request and DHCP response is illustrated, such that client endpoint 202 may transmit a L2 request as the data packet, which can be encapsulated and transmitted by first VPN controller 204 to second controller 210, which is received by DHCP server 220A. Other protocols may be supported within the VPN tunneling created in association with FIG. 2, including a multicast request and a multicast response for multicast server 220B, operating system networking protocols (e.g., BOOTP), or other L2 tunneling protocols (L2TP).

For example, at operation 5 of FIG. 2, the second DHCP request that was generated by the VPN software on client endpoint 202 that created the second virtual adapter to initiate the second DHCP request is then GRE encapsulated at first VPN controller 204 and transmitted to the appropriate second controller 210 for client endpoint 202. From authentication, a role may be derived which defines VLAN information. The VLAN information may be sufficient for first VPN controller 204 to forward L2 packet to second controller 210.

Second controller 210 removes the GRE-based encapsulation of the data packet from first VPN controller 204 and passes the second DHCP request to a L2 responsive device corresponding with the request, which in this example is DHCP server 220A in the network local to second controller 210.

At operation 6, the response to the second DHCP request (e.g., the "second DHCP response") is passed from the L2 responsive device back through second controller 210 where it is GRE-based encapsulated and transmitted to first VPN controller 204. First VPN controller 204 removes the GRE-based encapsulation and encrypts the response to the second DHCP request.

At operation 7, the response is transmitted through the established L3 VPN tunnel to client endpoint 202. Once client endpoint 202 receives the second DHCP response, the second virtual adapter that initiated the second DHCP request is configured with an IP address from the network local to second controller 210. Additionally, a L2 virtual tunnel is established between client endpoint 202 and second controller 210. The L2 virtual tunnel is embedded within the existing L3 VPN tunnel to client endpoint 202. As such, the existing L3 VPN tunnel can be used to securely forward the L2 frames without the additional overhead traditionally associated with conventional L2 tunnel or session establishment.

The L3 VPN tunnel (e.g., IPsec VPN tunnel, etc.) may terminate through deletion or by timing out. The GRE tunnel may terminate upon termination of the VPN tunnel, or a reboot command associated with client endpoint 202, first VPN controller 204, or second controller 210. In some examples, the GRE tunnel may be considered on demand and as a logical construct.

Figure 3:
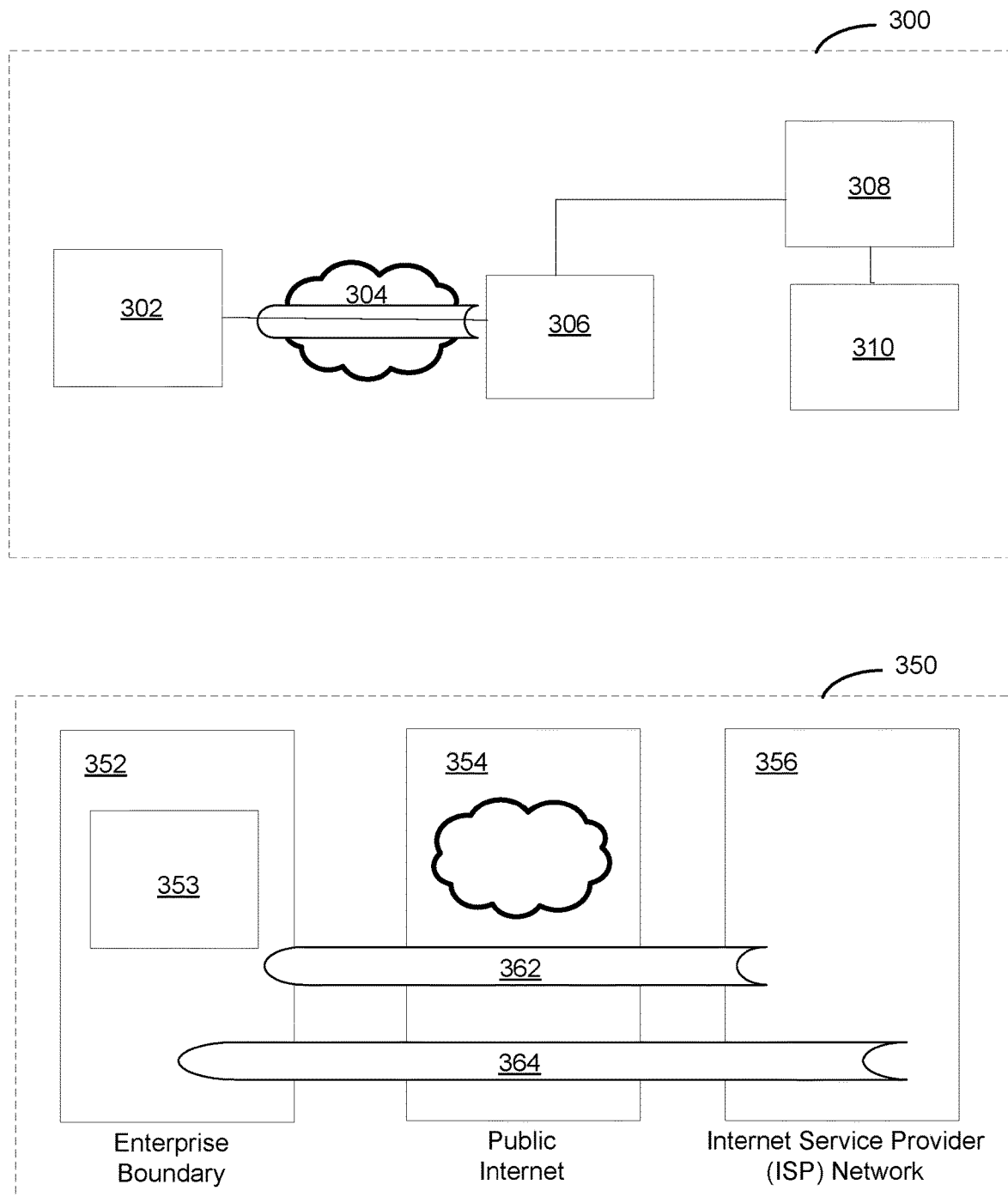
FIG. 3 illustrates an example of a network configuration implemented for a single client endpoint connected to a public network by accessing a central VPN controller using L3 tunneling, and further accessing resources in a home division network using L2 virtual tunneling, according to an embodiment of the disclosure.

FIG. 3 illustrates other examples of a network configuration. In illustration 300, client endpoint 302 may initiate an authentication process with first VPN controller 306. Upon authentication, established L3 VPN tunnel 304 may be created for electronic communications between client endpoint 302 and first VPN controller 306, similar to operations 1 through 4 illustrated in FIG. 2.

L2 data packets may be transmitted between first VPN controller 306 and second controller 308 using a GRE tunnel. For example, client endpoint 302 may transmit a multicast request to first VPN controller 306. The multicast request (e.g., L2 data) is then encapsulated using a GRE protocol at first VPN controller 306 and transmitted to an appropriate second controller 308 on a remote network for client endpoint 302 (e.g., using authentication or registration information from earlier).

Second controller 308 on the remote network removes the GRE-based encapsulation of the data packet from first VPN controller 306 and passes the multicast request to a L2 responsive device corresponding with the request, which in this example is multicast server 310 in a network local to second controller 308.

A response to the multicast request is passed back through second controller 308 where it is encapsulated using the GRE protocol and transmitted to first VPN controller 306. First VPN controller 306 removes the GRE-based encapsulation and encrypts the response to the multicast request.

The response is transmitted through the established L3 VPN tunnel to client endpoint 302. Once client endpoint 302 receives the multicast response, the initiating application installed on client endpoint 302 processes the multicast response accordingly. The L2 virtual tunnel is embedded within the established L3 VPN tunnel to client endpoint 302.

In computer network 350, a plurality of local networks are shown. For example, client endpoint 353 exists in a local network confined by an enterprise boundary 352. To communicate with remote networks (not shown), client endpoint 353 may establish a VPN connection over public internet 354 and to remote networks accessible via an internet service provider (ISP) network 356 through an L3 VPN tunnel 362. In order for devices on the local network to connect to enterprise boundary 352 to reach devices in a remote network, a virtual tunnel 364 may be established in embodiments of the disclosure. For example, as explained throughout the disclosure, the existing L3 VPN tunnel 362 can be used to securely forward L2 data frames through an L2 virtual tunnel 364 between client endpoint 353 in a local network confined by an enterprise boundary 352 and remote networks accessible via an internet service provider (ISP) network 356. The L2 virtual tunnel 364 may be embedded within the established L3 VPN tunnel 362 or separate, as provided in computer network 350.

Figure 4:
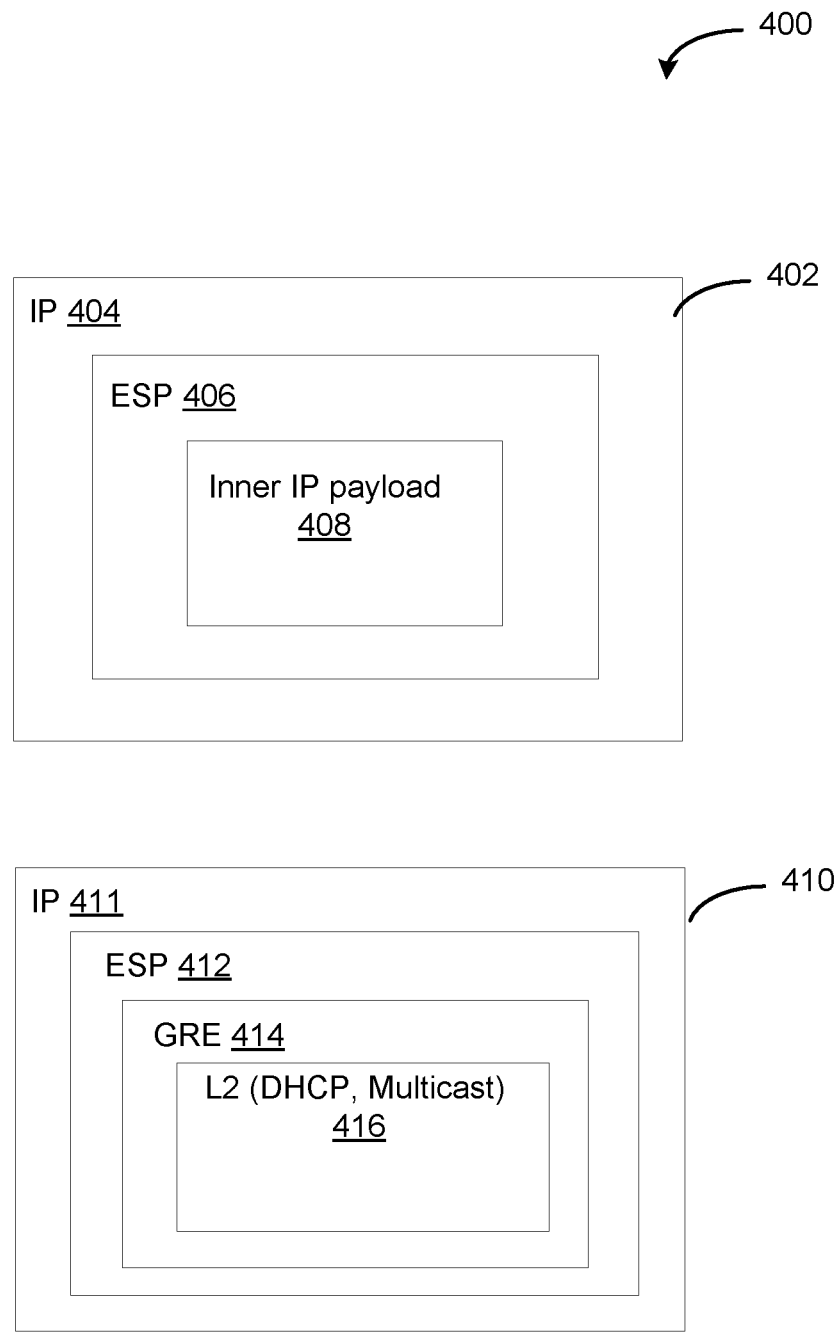
FIG. 4 illustrates sample data packet structures, according to embodiments of the disclosure.

FIG. 4 illustrates sample data packet structures, according to embodiments of the disclosure. In illustration 400, a plurality of packet structures are provided. Each packet may consist of flags, version information, tunnel identifier, sequence number for the data or control message, offset size, and payload data.

First packet structure 402 may identify a packet structure corresponding with data transmitted in accordance with a L3 tunnel and when L2 tunneling has not been established. The packet structure may comprise inner IP payload 406 (e.g., IP datagram) encapsulated by encapsulating security payload (ESP) header 404, encapsulated by IP header 402 containing the address of a gateway device to the packet. First packet structure 402 may be transmitted via an L3 VPN tunnel using mutual certificate authentication or standard negotiation and authentication procedures. First packet structure 402 may correspond with a standard VPN tunnel protocol.

Second packet structure 410 may be provided when the L2 traffic is flowing within the L3 tunnel (e.g., GRE tunneling between first VPN controller 204 and second controller 210). The use of the GRE packet in the established L3 VPN tunnel can be used to securely forward the L2 frames without the additional overhead traditionally associated with conventional L2 tunnel or session establishment.

In second packet structure 410, the packet structure may comprise inner L2 payload 416 for a responsive L2 device (e.g., DHCP server 220A and multicast server 220B), encapsulated by GRE-based encapsulation 414, encapsulated by ESP header 412, encapsulated by IP header 411 containing the address of a gateway device to the packet.

Figure 5:
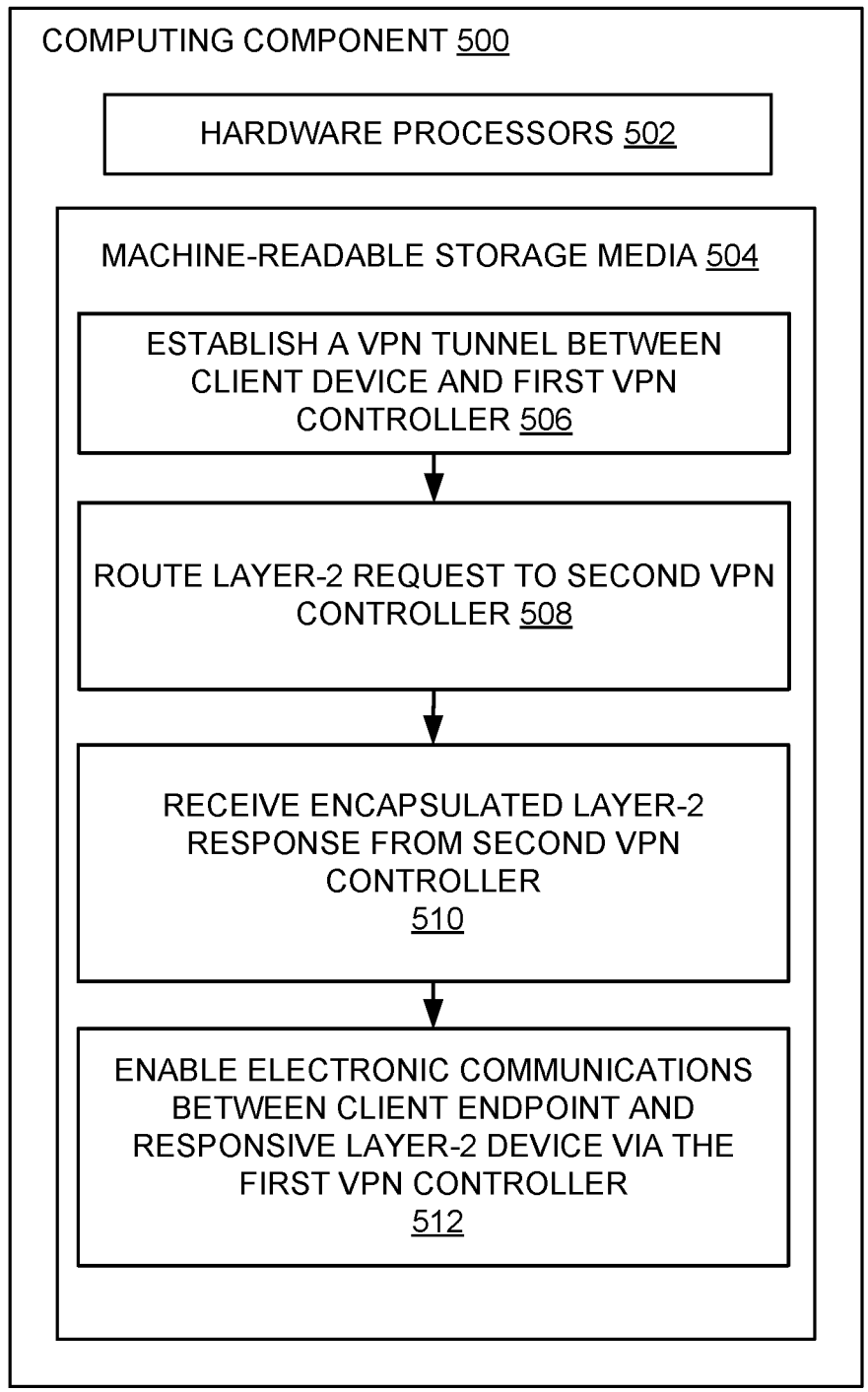
FIG. 5 illustrates a block diagram of an example computing component or device for transmitting layer-two data packets using layer-three tunneling, according to embodiments of the disclosure.

FIG. 5 illustrates a block diagram of an example computing component for transmitting L2 data packets using L3 tunneling, according to embodiments of the disclosure. Computing component 500 may be, for example, a server computer, a controller, or any other similar computing component capable of processing data. In the example implementation of FIG. 5, the computing component 500 includes one or more hardware processors 502 and one or more machine-readable storage media 504. In some embodiments, computing component 500 may be an embodiment of client endpoint 202.

Hardware processor 502 may be one or more first processing units (CPUs), semiconductor-based microprocessors, and/or other hardware devices suitable for retrieval and execution of instructions stored in machine-readable storage media 504. Hardware processor 502 may fetch, decode, and execute instructions, such as instructions 506-510, to control processes or operations for establishing and communication via various communication tunnels. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage media 504, may be any electronic, magnetic, optical, or other physical storage device that contains or stores executable instructions. Thus, machine-readable storage media 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage media 504 may be a non-transitory storage medium, where the term "non-transitory" does not encompass transitory propagating signals. As described in detail below, machine-readable storage media 504 may be encoded with executable instructions, for example, instructions 506-510.

Hardware processor 502 may execute instruction 506 to perform establishing a VPN tunnel between client endpoint 202 and first VPN controller 204. The establishment of the VPN tunnel may be provided periodically, on request from client endpoint 202, by other methods, or any combination thereof.

Hardware processor 502 may execute instruction 508 to perform routing a L2 request to a second controller 210 via an established communication tunnel between first VPN controller 204 and second controller 210. This may include identifying a generic routing encapsulation (GRE) header of the L2 request and directing the L2 request to second controller 210 via an established communication tunnel between first VPN controller 204 in second controller 210.

Hardware processor 502 may execute instruction 510 to perform receiving an encapsulated L2 response from second controller 210 identifying acceptance of the L2 request. In some examples, the instructions may forward the L2 response to client endpoint 202 that is responsive to the L2 request.

Hardware processor 502 may execute instruction 512 to perform enabling an electronic communication between client endpoint 202 and responsive L2 device 220 at least via the VPN tunnel between client endpoint 202 and first VPN controller 204.

Figure 6:
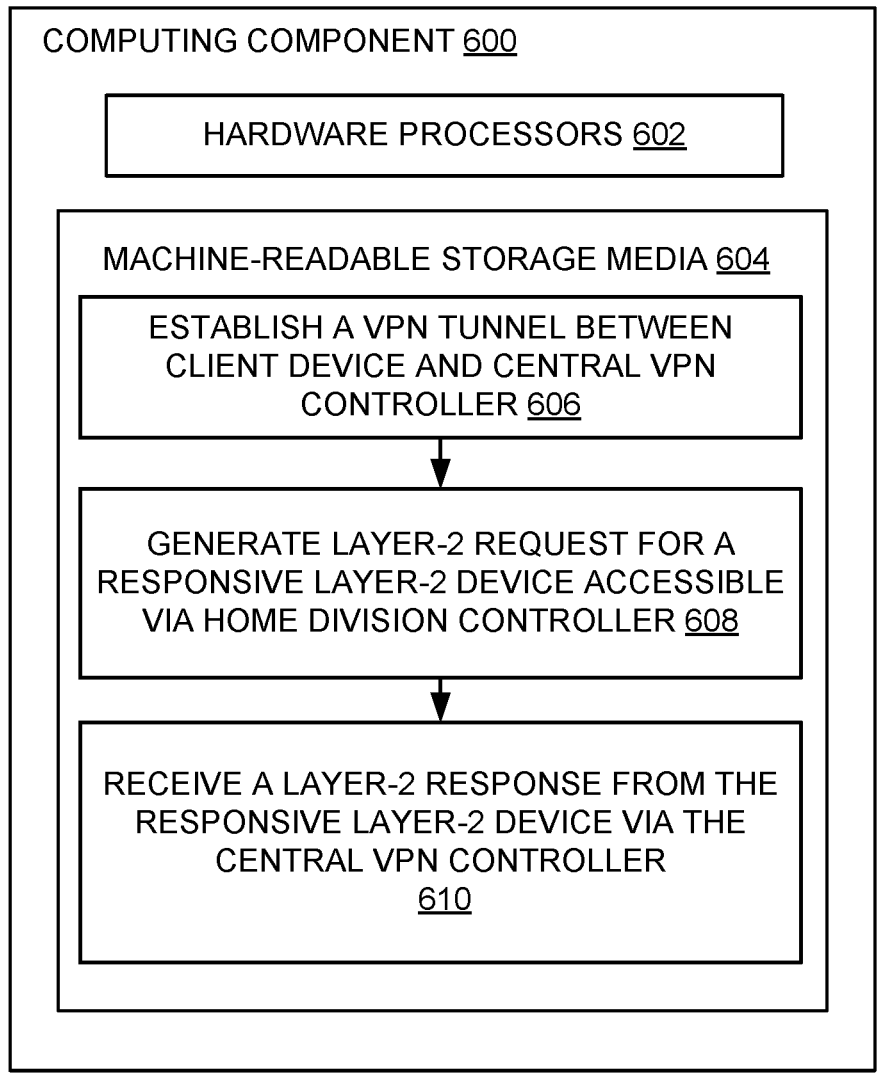
FIG. 6 illustrates a block diagram of a second example computing component or device for transmitting layer-two data packets using layer-three tunneling, according to embodiments of the disclosure.

FIG. 6 illustrates a block diagram of a second example computing component or device for transmitting L2 data packets using L3 tunneling, according to embodiments of the disclosure. Computing component 600 may be, for example, a server computer, a controller, or any other similar computing component capable of processing data. In the example implementation of FIG. 6, the computing component 600 includes one or more hardware processors 602 and one or more machine-readable storage media 604. In some embodiments, computing component 600 may be an embodiment of client endpoint 202.

Hardware processor 602 may be one or more first processing units (CPUs), semiconductor-based microprocessors, and/or other hardware devices suitable for retrieval and execution of instructions stored in machine-readable storage media 604. Hardware processor 602 may fetch, decode, and execute instructions, such as instructions 606-610, to control processes or operations for establishing and communication via various communication tunnels. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage media 604, may be any electronic, magnetic, optical, or other physical storage device that contains or stores executable instructions. Thus, machine-readable storage media 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage media 604 may be a non-transitory storage medium, where the term "non-transitory" does not encompass transitory propagating signals. As described in detail below, machine-readable storage media 604 may be encoded with executable instructions, for example, instructions 606-610.

Hardware processor 602 may execute instruction 606 to perform establishing a VPN tunnel between client endpoint 202 and first VPN controller 204. The establishment of the VPN tunnel may be provided periodically, on request from client endpoint 202, by other methods, or any combination thereof.

Hardware processor 602 may execute instruction 608 to perform generating L2 request for responsive L2 device 220 accessible via second controller 210. For example, first VPN controller 204 may identify a generic routing encapsulation (GRE) header of the L2 request. In accordance with the GRE header, first VPN controller 204 may forward the L2 request to the second controller 210 via an established communication tunnel between first VPN controller 204 in second controller 210.

Hardware processor 602 may execute instruction 610 to perform receive a L2 response from responsive L2 device 220 via first VPN controller 204. For example, client endpoint 202 may receive a L2 response that is responsive to the L2 request.

Figure 7:
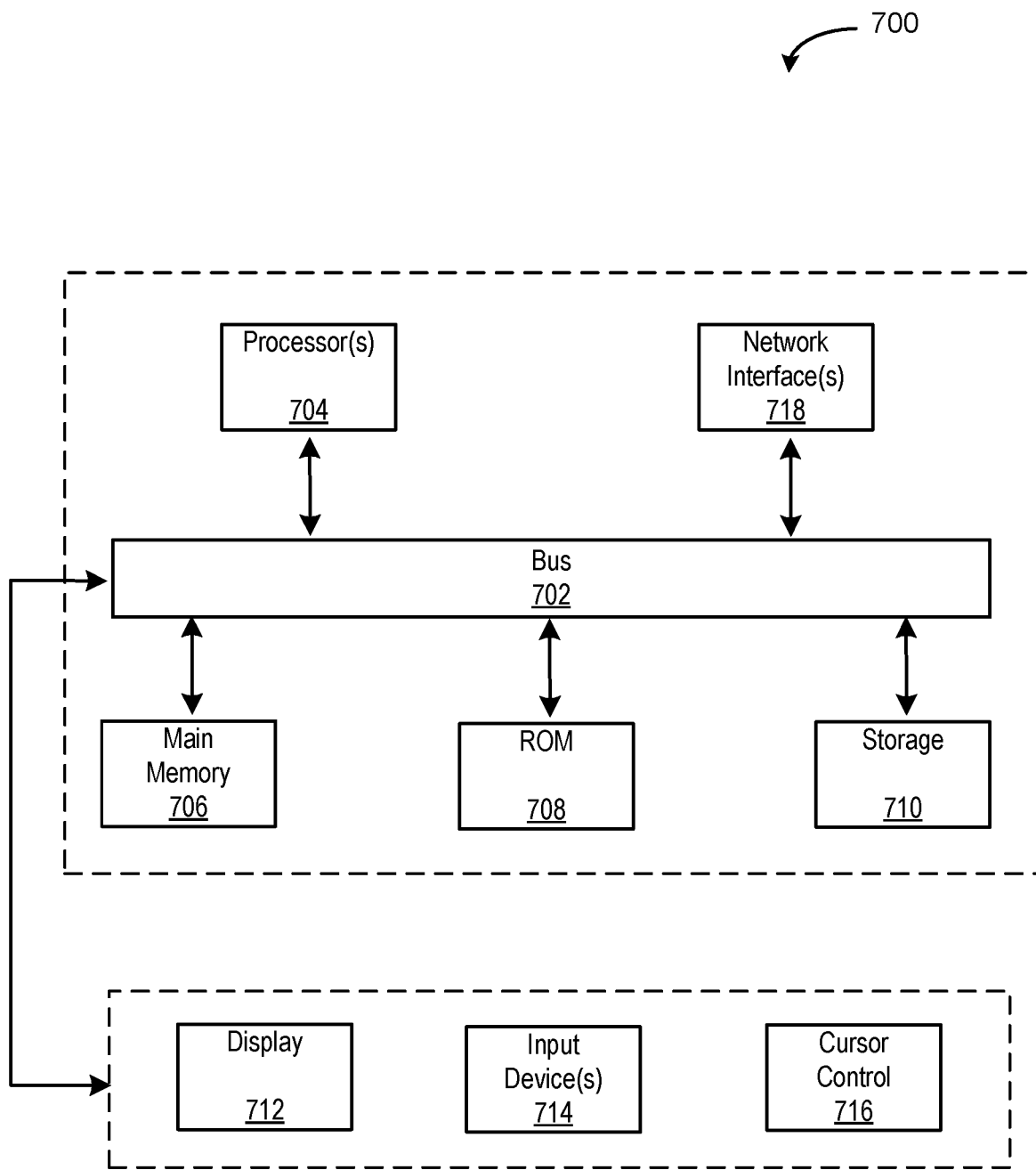
FIG. 7 is an example computing component that may be used to implement various features of embodiments described in the present disclosure.

FIG. 7 depicts a block diagram of an example computer system 700 in which various of the embodiments described herein may be implemented. Computer system 700 includes bus 702 or other communication mechanism for communicating information, one or more hardware processors 704 coupled with bus 702 for processing information. Hardware processor(s) 704 may be, for example, one or more general purpose microprocessors.

Computer system 700 also includes main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. Storage device 710, such as a magnetic disk, optical disk, or USB thumb drive (Flash drive), etc., is provided and coupled to bus 702 for storing information and instructions.

Computer system 700 may be coupled via bus 702 to display 712, such as a liquid crystal display (LCD) (or touch screen), for displaying information to a computer user. Input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

Computer system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C, or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Computer system 700 also includes communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

Computer system 700 can send messages and receive data, including program code, through the network(s), network link and communication interface 718. In the Internet example, a server might transmit a requested code for an application program through the Internet, the ISP, the local network and communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A first Virtual Private Network (VPN) controller configured to:
   establish a VPN tunnel with a client endpoint, wherein the VPN tunnel is established using an authentication process of the client endpoint;
   route a L2 request to a second VPN controller via an established communication tunnel between the first VPN controller and the second VPN controller, by:
     identifying a Generic Routing Encapsulation (GRE) header of the L2 request, and
     based on the GRE header of the L2 request, directing the L2 request to a responsive L2 device accessible by the second VPN controller;
   receive an encapsulated L2 response from the second VPN controller identifying acceptance of the L2 request; and
   enable an electronic communication between the client endpoint and the responsive L2 device at least via the VPN tunnel between the client endpoint and the first VPN controller.

2. The first VPN controller of claim 1, wherein the VPN tunnel is an IPsec VPN tunnel.

3. The first VPN controller of claim 1, wherein the L2 request is a Dynamic Host Configuration Protocol (DHCP) request and the responsive L2 device is a DHCP server computer.

4. The first VPN controller of claim 1, wherein the L2 request is a multicast request and the responsive L2 device is a multicast server computer.

5. The first VPN controller of claim 1, wherein the authentication process includes a transmission of one or more credentials to a third party authentication device.

6. The first VPN controller of claim 1, wherein the second VPN controller forwards the L2 request to the responsive L2 device in a network local to the second VPN controller.

7. A distributed system comprising:
   the first VPN controller of claim 1; and
   the second VPN controller, wherein the second VPN controller is configured to:
     remove the GRE header of the L2 request from the first VPN controller; and
     pass the L2 request to the L2 responsive device corresponding to the L2 request.

8. A non-transitory computer-readable medium comprising instructions that when executed by a processor cause a network device to:
   establish a VPN tunnel with a client endpoint, wherein the VPN tunnel is established using an authentication process of the client endpoint;
   route a L2 request to a VPN controller via an established communication tunnel between the network device and the VPN controller, by:
     identifying a Generic Routing Encapsulation (GRE) header of the L2 request, and
     based on the GRE header of the L2 request, directing the L2 request to a responsive L2 device accessible by the VPN controller;
   receive an encapsulated L2 response from the VPN controller identifying acceptance of the L2 request; and
   enable an electronic communication between the client endpoint and the responsive L2 device at least via the VPN tunnel between the client endpoint and the network device.

9. The computer-readable medium of claim 8, wherein the network device is a first VPN controller and the VPN controller is a second VPN controller.

10. The computer-readable medium of claim 8, wherein the VPN tunnel is an IPsec VPN tunnel.

11. The computer-readable medium of claim 8, wherein the L2 request is a Dynamic Host Configuration Protocol (DHCP) request and the responsive L2 device is a DHCP server computer.

12. The computer-readable medium of claim 8, wherein the L2 request is a multicast request and the responsive L2 device is a multicast server computer.

13. The computer-readable medium of claim 8, wherein the authentication process includes a transmission of one or more credentials to a third party authentication device.

14. The computer-readable medium of claim 8, wherein the second VPN controller forwards the L2 request to the responsive L2 device in a network local to the second VPN controller.

15. A method performed by a first Virtual Private Network (VPN) controller of a distributed system comprising:
   establish a VPN tunnel with a client endpoint, wherein the VPN tunnel is established using an authentication process of the client endpoint;
   route a L2 request to a second VPN controller via an established communication tunnel between the first VPN controller and the second VPN controller, by:
      identifying a Generic Routing Encapsulation (GRE) header of the L2 request, and
      based on the GRE header of the L2 request, directing the L2 request to a responsive L2 device accessible by the second VPN controller;
   receive an encapsulated L2 response from the second VPN controller identifying acceptance of the L2 request; and
   enable an electronic communication between the client endpoint and the responsive L2 device at least via the VPN tunnel between the client endpoint and the first VPN controller.

16. The method of claim 13, wherein the VPN tunnel is an IPsec VPN tunnel.

17. The method of claim 13, wherein the L2 request is a Dynamic Host Configuration Protocol (DHCP) request and the responsive L2 device is a DHCP server computer.

18. The method of claim 13, wherein the L2 request is a multicast request and the responsive L2 device is a multicast server computer.

19. The method of claim 13, wherein the authentication process includes a transmission of one or more credentials to a third party authentication device.

20. The method of claim 13, wherein the second VPN controller forwards the L2 request to the responsive L2 device in a network local to the second VPN controller.

\* \* \* \* \*